United States Patent [19]
Yonemura

[11] Patent Number: 5,661,832
[45] Date of Patent: Aug. 26, 1997

[54] OPTICAL CONNECTOR STRUCTURE, OPTICAL FIBER CORD ASSEMBLY AND PROCESS OF PRODUCING OPTICAL FIBER CORD ASSEMBLY

[75] Inventor: Ryugen Yonemura, Osaka, Japan

[73] Assignee: Sumitomo Electric Industries, Ltd., Osaka, Japan

[21] Appl. No.: 563,575

[22] Filed: Nov. 28, 1995

[51] Int. Cl.$^6$ .................................................. G02B 6/38
[52] U.S. Cl. ........................... 385/88; 385/72; 385/78
[58] Field of Search .............................. 385/88–94, 72, 385/78, 85

[56] References Cited

U.S. PATENT DOCUMENTS

| | | | |
|---|---|---|---|
| 5,073,047 | 12/1991 | Suzuki et al. | 385/93 |
| 5,127,074 | 6/1992 | Watanable et al. | 385/93 |

FOREIGN PATENT DOCUMENTS

| | | |
|---|---|---|
| 0008504 | 3/1980 | European Pat. Off. |
| 0104513 | 4/1984 | European Pat. Off. |
| 0152225 | 8/1985 | European Pat. Off. |
| 0664466 | 7/1995 | European Pat. Off. |
| 0666486 | 8/1995 | European Pat. Off. |

OTHER PUBLICATIONS

Patent Abstracts of Japan for Publication No. JP56057014. Oct. 1979.
Patent Abstracts of Japan for Publication No. JP57181513. Nov. 1982.

*Primary Examiner*—Phan T. H. Palmer
*Attorney, Agent, or Firm*—Beveridge, DeGrandi, Weilacher & Young, LLP.

[57] ABSTRACT

Herein disclosed is an optical connector structure for optically connecting an optical object and an optical fiber cord made of synthetic resin. The optical connector structure comprises a plug member coupleable with a receptacle member. A ferrule member is retained by the plug member to hold the optical fiber cord. The ferrule member has a front end face engageable with the front end face of the optical object retained by the receptacle member. The front end portion of the optical fiber cord is retained by the front end portion of the ferrule member in engagement with the engaging bore of the ferrule member with the front end face of the optical fiber cord being rearwardly retracted from the front end face of the ferrule member. The front end face of the optical fiber cord can be protected from being damaged and adhered by foreign objects before the plug member is coupled with the receptacle member to complete optical connection between the optical fiber cord and the optical object.

23 Claims, 8 Drawing Sheets

OPTICAL CONNECTOR STRUCTURE, OPTICAL FIBER CORD ASSEMBLY AND PROCESS OF PRODUCING OPTICAL FIBER CORD ASSEMBLY

FIELD OF THE INVENTION

The present invention relates to an optical connector structure for optically connecting an optical object and an optical fiber cord made of synthetic resin, and more particularly to an improved optical connector structure for use in an optical transmission apparatus which is to be assembled with a navigation system for automotive vehicles, an audio-video system, and other optical communication systems to perform data transmission between devices, parts and elements forming those systems.

DESCRIPTION OF THE PRIOR ART

Conventionally, there have been proposed a wide variety of optical connector structures of this kind which are used in various industrial fields because the optical connection structures are each assembled with an optical fiber cord made of synthetic resin which is inexpensive as compared with an optical fiber cord made of glass fiber cord. Further, the conventional optical connector structures are usually employed under the worst environment affected with intensive mechanical vibrations, strong magnetic noises and the like. In addition to these troublesome problems, such an optical connector structure is susceptible to foreign objects such as oil and cut rubbish before the optical fiber cord is connected with the optical object in such a way that such oil scattered from nearby machines is easily adhered to the front end face of optical fiber cord in part retained by the optical connector structure, while such cut rubbish from nearby machines may to readily damage the front end face of the optical fiber cord. The oil and cut rubbish thus adhered to and damaging to the front end face of the optical fiber cord results in light scattering and undesirable light absorption phenomena caused on the optical fiber cord, thereby bringing about an unfavorable effect directly to light transmission between the optical object and the optical fiber cord. Furthermore, the known optical connector structures are frequently used in extremely narrow spaces such as engine rooms for automotive vehicles. From this reason, the optical connector structure is required to have a size as small as possible.

Figure 13:
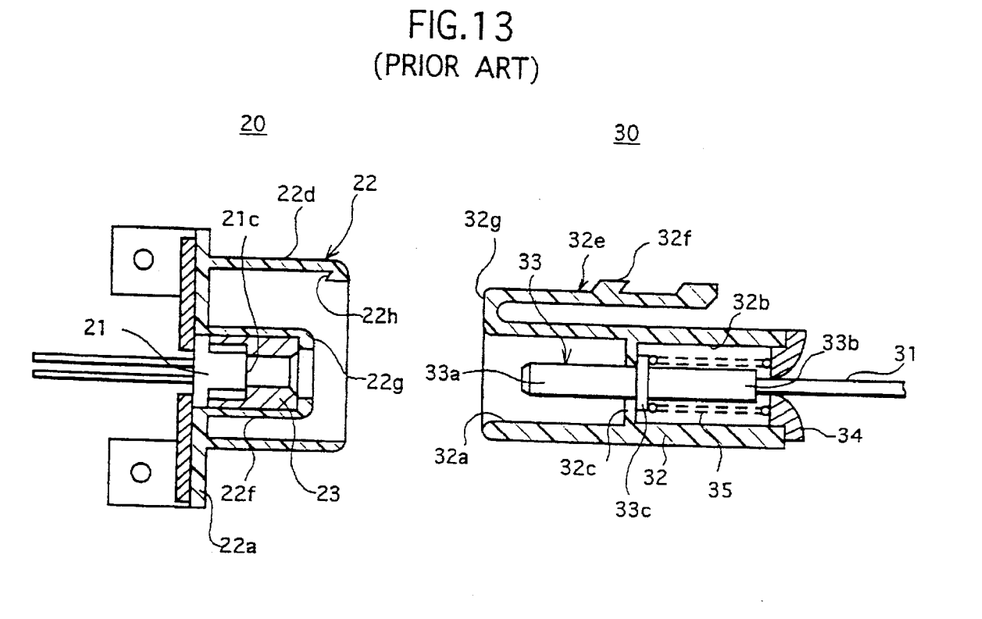
FIG. 13 is a cross-sectional view of a conventional optical connector structure similar to FIG. 1 but showing a ferrule member having a front end portion rearwardly retracted from the front end face of a plug member.

The typical example of the prior-art optical connector structure is shown in FIG. 13 as being designed to optically connect an optical fiber cord made of synthetic fiber with an optical object constituted by a light emitting diode. The prior-art optical connector structure generally comprises a receptacle assembly 20 and a plug assembly 30. The receptacle assembly 20 includes a stationary receptacle member 22 having a base portion 22a, an outer annular portion 22d projecting forwardly of the base portion 22a, and an inner annular portion 22f projecting forwardly of the base portion 22a within the outer annular portion 22d and in coaxial relationship with the outer annular portion 22d. The receptacle assembly 20 further includes an optical object 21 received in the inner annular portion 22f of the receptacle member 22 adjacent to the base portion 22a of the receptacle member 22, and a cylindrical sleeve 23 received in the inner annular portion 22f of the receptacle member 22 between the optical object 21 and the front end face 22g of the inner annular portion 22f of the receptacle member 22.

The plug assembly 30 includes a cylindrical plug member 32 having a front chamber 32a and a rear chamber 32b separate from each other by a partition wall 32c, and an outer tongue 32e outwardly rearwardly projecting from the front end face 32g thereof. The outer tongue 32e of the plug member 32 has an outwardly rearwardly projecting hook 32f which is of the configuration engageable with an inwardly rearwardly projecting hook 22h formed on the outer annular portion 22d of the receptacle member 22 when the receptacle member 22 and the plug member 32 are coupled with each other. The plug assembly 30 further comprises an elongate ferrule member 33 having front and rear portions 33a and 33b, and a longitudinally intermediate portion formed with an annular flange portion 33c to have the front and rear portions 33a and 33b separate from each other. The front portion 33a of the ferrule member 33 extends in the front chamber 32a of the plug member 32, while the rear portion 33b of the ferrule member 33 extends in the rear chamber 32b of the plug member 32. The plug assembly 30 further comprises a spring seating member 34 coupled with the rear end portion of the plug member 32, and a helical compression spring 35 accommodated in the rear chamber 32b of the plug member 32 around the rear portion 33b of the ferrule member 33 to resiliently urge the ferrule member 33 toward the front end face 32g of the plug member 32.

The optical connector structure thus constructed in the above is operated to have the receptacle member 22 and the plug member 32 coupled with each other by moving the receptacle member 22 and the plug member 32 toward each other to have the front end portion 33a of the ferrule member 33 received in the cylindrical sleeve 23 of the receptacle assembly 20 until the hook 22h of the outer annular portion 22d of the receptacle member 22 are brought into engagement with the hook 32f of the plug member 32. At this time, the front end portion 33a of the ferrule member 33 comes to be in pressing engagement with the front end face 21c of the optical element 21 under the influence of the compression spring 35, while the front end face 32g of the plug member 32 comes to be held in spaced and face-to-face relationship with the front end face of the base portion 22a of the receptacle member 22.

Figure 16:
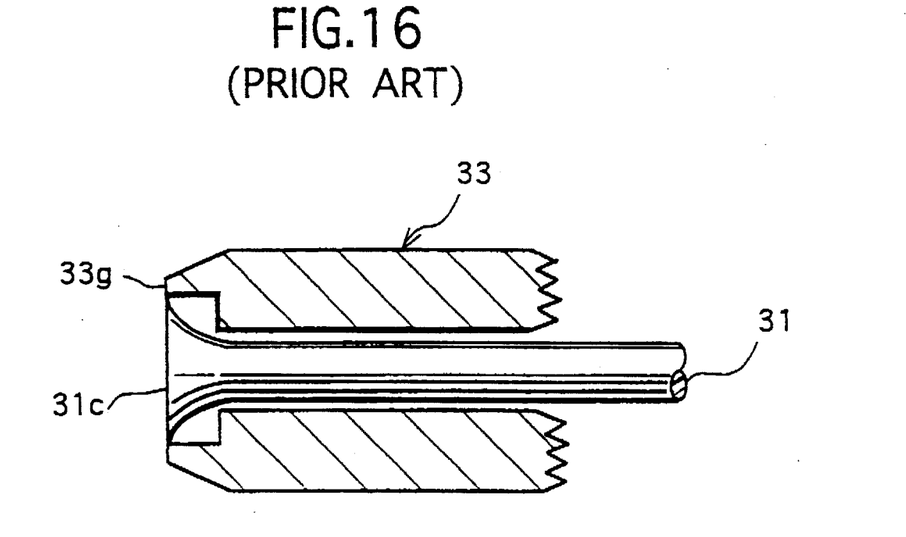
FIG. 16 is a fragmentary cross-sectional view of the ferrule member and the optical fiber cord respectively having front end faces flush with each other.

The optical fiber cord 31 produced for use in the conventional optical connector structure has a front end face 31c flush with the front end face 33g of the ferrule member 33 as will be seen from FIG. 16. However, the front end face 31c of the optical fiber cord 31 is certain to be protected from being damaged and adhered by foreign objects while the optical cord 31 is being handled by industrial robots and operators because of the fact that the front end faces 31c and 33g of the optical fiber cord 31 and the ferrule member 33 are retracted rearwardly from the front end face 32g of the plug member 32. The plug member 32 is, however, destined to have a front portion projected forwardly from the front end faces 31c and 33g of the optical fiber cord 31 and the ferrule member 33. This projected front end portion of the plug member 32 is long enough to the extent that the operators feel it difficult to handle the optical connector structure especially in extremely narrow spaces such as engine rooms for automotive vehicles.

Figure 14:
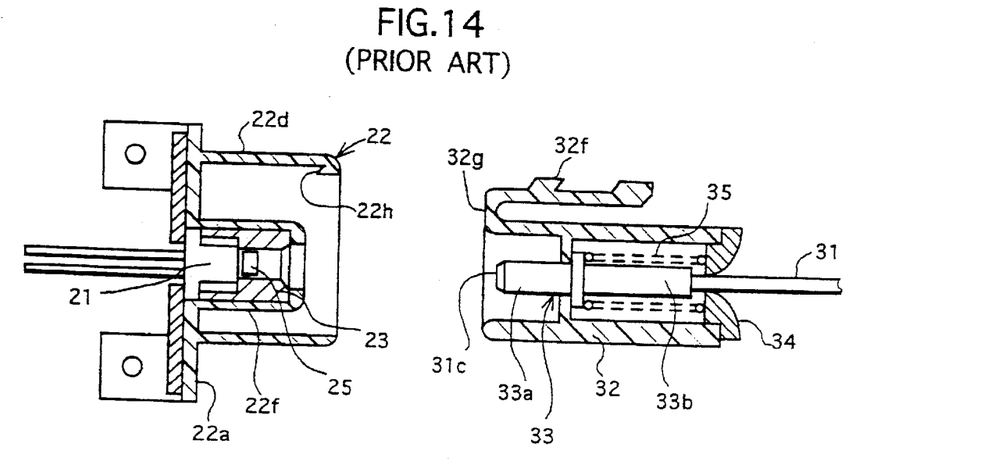
FIG. 14 is a cross-sectional view of a conventional optical connector structure similar to FIG. 1 but showing a ferrule member having a front end portion rearwardly retracted from the front end face of a plug member.

In order to overcome the above drawback inherent in the previous conventional optical connector structure, there has so far been provided another prior-art optical connector structure which is illustrated in FIG. 14.

Figure 15:
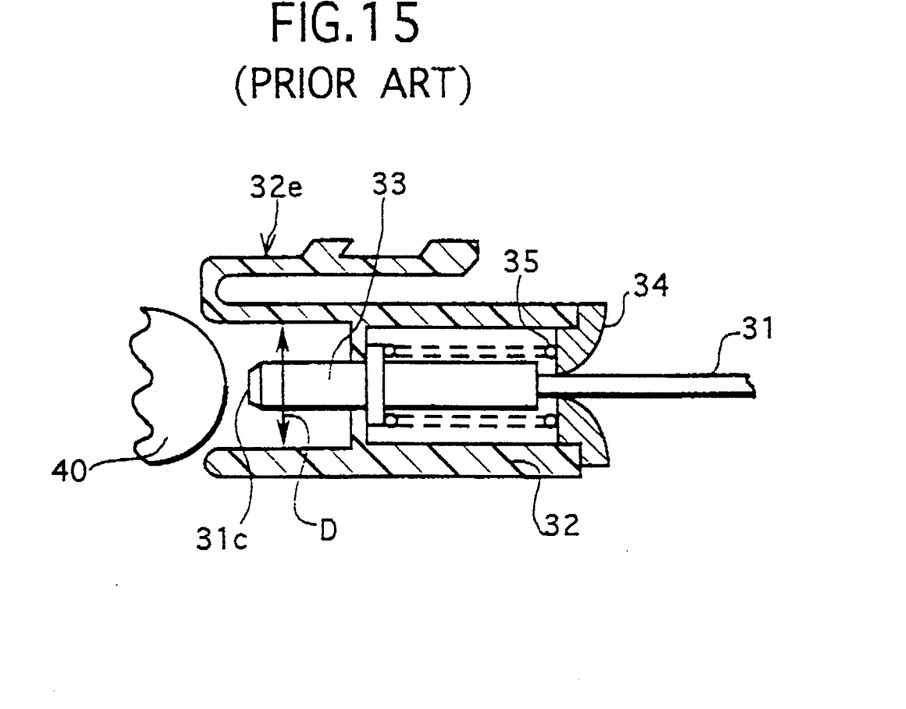
FIG. 15 is a cross-sectional view of a plug member and shows a ferrule member rearwardly retracted from the front end face of the plug member to be protected from a finger of an operator.

The prior-art optical connector structure is constructed to have the plug member cut short enough that the operators feel it easy to handle the optical connector structure especially in extremely narrow spaces. In this instance, the front end face 31c of the optical fiber cord is rearwardly retracted from the front end face 32g of the plug member 32 as shown in FIG. 14. The rearwardly retracted front end face 31c of the optical fiber cord 31 is more advantageous than the front end face 31c of the optical fiber cord 31 forwardly projected from the front end face 32g of the plug member 32 simply for the purpose of protecting the front end face 31c of the optical fiber cord 31 from being damaged by the foreign objects as will be seen from FIG. 15 in which the finger tip 40 of an operator fails to become in touch with the front end face 31c of the optical fiber cord. This, however, may lead to the fact that the front end face 31c of the optical fiber cord 31 is spaced apart from the front end face 21c of the optical object 21 when the plug member 32 is coupled with the receptacle member 22 to establish optical connection between the optical object 21 and the optical fiber cord 31, thereby resulting in making it necessary to provide an optical spacer 25 between the front end faces 21c and 31c of the optical object 21 and the optical fiber cord 31. This renders for operators to be requested to prepare such an optical spacer 25 before the receptacle member 22 is coupled with the plug member 32. The preparation operation of the optical spacer 25 has so far been disadvantageous in management of parts and elements to be assembled together.

Instead of such an optical fiber cord being employed for such optical connector structure, the optical fiber cord is applied to other uses such as for example, checking, wiring, representing, and displaying. In this instance, the optical fiber cord is likely to be damaged at its front end face, thereby bringing about inferior efficiency to the effect of optical connection between the optical object and optical fiber cord as will be appreciated in the foregoing conventional optical connector structure.

SUMMARY OF THE INVENTION

It is therefore a primary object of the present invention to provide an optical connector structure which is free from being subject to the foreign objects to damage the front end face of the optical fiber cord.

It is another object of the present invention to provide an optical connector structure which is inexpensive in production.

It is a further object of the present invention to provide an optical connector structure which is constituted partly by a plug member having its length as small as possible.

It is a still further object of the present invention to provide an optical fiber cord assembly which is free from being subject to the foreign objects that damage the front end face of the optical fiber cord even if the optical fiber cord is used for purposes other than such an optical connector structure.

It is a yet further object of the present invention to provide an optical fiber cord assembly producing process which is carried out with an optical fiber cord made of synthetic resin through simple steps.

According to the first aspect of the present invention, there is provided an optical connector structure for optically connecting an optical object and an optical fiber cord made of synthetic resin with each other. The optical connector structure comprises: a receptacle assembly including a receptacle member for retaining the optical object having a front end face; a plug assembly including a plug member coupleable with the receptacle member, and a ferrule member retained by the plug member to hold the optical fiber cord, the ferrule member having a front end face engageable with the front end face of the optical object to establish optical connection between the optical object and the optical fiber cord when the plug member is coupled with the receptacle member, wherein the ferrule member having a front end portion formed with an engaging bore open at its front end face, and an intermediate portion integrally formed with the front end portion and having a through bore formed therein in communication with the engaging bore, the optical fiber cord extending in the engaging bore and the through bore of the ferrule member and having a front end portion and an intermediate portion integrally formed with the front end portion, the front end portion of the optical fiber cord being so formed as to be larger in diameter than the intermediate portion of the optical fiber cord and retained by the front end portion of the ferrule member in engagement with the engaging bore of the ferrule member with the front end face of the optical fiber cord being rearwardly retracted from the front end face of the ferrule member and held in spaced relationship with the front end face of the optical object when the plug member is coupled with the receptacle member to establish optical connection between the optical object and the optical fiber cord.

The distance between the front end face of the optical fiber cord and the front end face of the ferrule member may be in the range of 0.03 mm to 0.6 mm.

The distance between the front end face of the optical fiber cord and the front end face of the ferrule member may be in the range of 0.05 mm to 0.3 mm.

The optical fiber cord made of synthetic resin can be utilized for facilitating transforming of the front end portion of the optical fiber cord to secure inexpensive optical fiber cord. The optical connector structure is available at a relatively low cost in addition with the inexpensive optical fiber cord if the ferrule member is similarly made of synthetic resin.

The engaging bore of the ferrule member may be in the form of frusto-conical shape rearwardly converged away from the front end face of the ferrule member, and the front end portion of the optical fiber cord has an engaging surface in the form of frusto-conical shape rearwardly converged to be held in pressing engagement with the engaging bore of the ferrule member.

The engaging bore of the ferrule member may be so formed as to be larger in diameter than the through bore and communicated with the through bore by way of a restriction shoulder, and the front end portion of the optical fiber cord being larger in diameter than the through bore and smaller than the engaging bore to be prevented from being moved away from the front end face of the ferrule member by the restriction shoulder.

The engaging bore of the ferrule member may be so formed as to be larger in diameter than the through bore, and the front end portion of the optical fiber cord has an engaging surface rearwardly converged, the engaging bore of the ferrule member being in communication with the through bore by way of a restriction shoulder which is rearwardly converged to be held in pressing engagement with the engaging surface of the front end portion of the optical fiber cord.

The front end face of the optical fiber cord may be in the form of a convex shape.

According to the second aspect of the present invention, a fiber cord assembly comprises: a ferrule member for holding an optical fiber cord made of synthetic resin, the ferrule member having a front end face, a front end portion formed with an engaging bore open at its front end face, and an intermediate portion integrally formed with the front end portion and having a through bore formed therein in communication with the engaging bore, the optical fiber cord extending in the engaging bore and the through bore of the ferrule member and having a front end portion and an intermediate portion integrally formed with the front end portion, the front end portion of the optical fiber cord being so formed as to be larger in diameter than the intermediate portion of the optical fiber cord and retained by the front end portion of the ferrule member in engagement with the engaging bore of the ferrule member with the front end face of the optical fiber cord being rearwardly retracted from the front end face of the ferrule member.

According to the third aspect of the present invention, a process of producing an optical fiber cord assembly, comprises the steps of: preparing an optical fiber cord made of synthetic resin and having a front end portion and an intermediate portion integrally formed with the front end portion, the front end portion being equal in diameter to the intermediate portion; preparing a ferrule member for holding the optical fiber cord, the ferrule member having a front end face, a front end portion formed with an engaging bore open at its front end face, and an intermediate portion integrally formed with the front end portion and having a through bore formed therein in communication with the engaging bore; stripping a cover material covering the optical fiber cord from the front end portion of the optical fiber cord; inserting the optical fiber cord into the through bore and the engaging bore of the ferrule member until the front end portion projects from the front end face of the ferrule member; imparting heat to the front end portion of the optical fiber cord until the front end portion of the optical fiber cord is transformed into becoming larger in diameter than the through bore of the ferrule member and smaller in diameter than the engaging bore of the ferrule member; and rearwardly retracting the front end portion of the optical fiber cord until the front end portion of the optical fiber cord is brought into pressing engagement with the engaging bore of the ferrule member to be retained by the front end portion of the ferrule member with the front end face of the optical fiber cord being rearwardly retracted from the front end face of the ferrule member.

BRIEF DESCRIPTION OF THE DRAWINGS

The features and advantages of an optical connector structure and an optical fiber cord assembly in accordance with the present invention will be more clearly understood from the following description taken in conjunction with the accompanying drawings in which.

DESCRIPTION OF THE PREFERRED EMBODIMENTS

Figure 1:
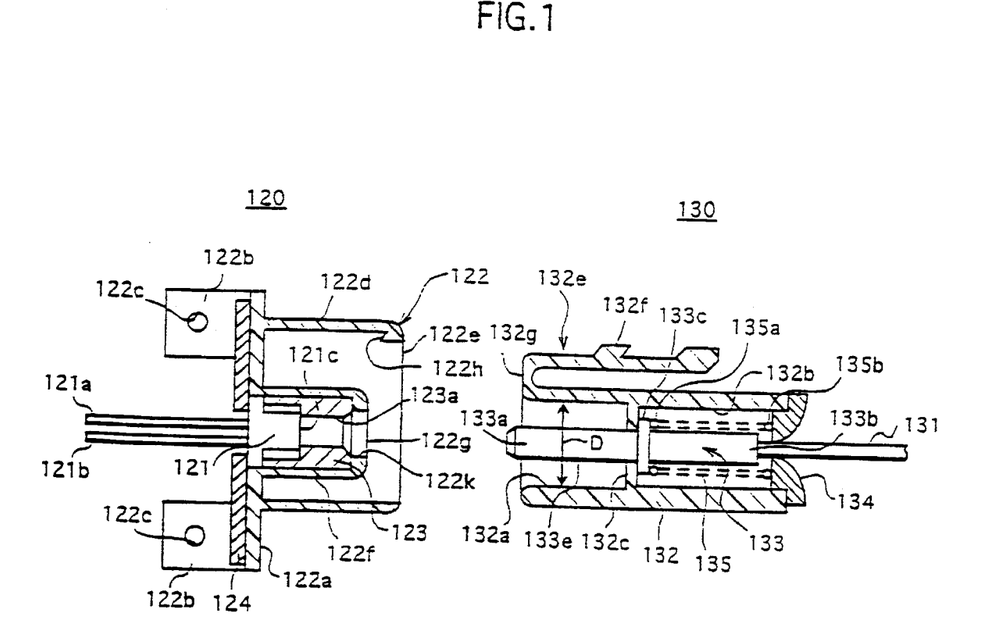
FIG. 1 is a cross-sectional view of an optical connector structure embodying the present invention and showing a receptacle member and a plug member facing each other before being coupled with each other.
Figure 2:
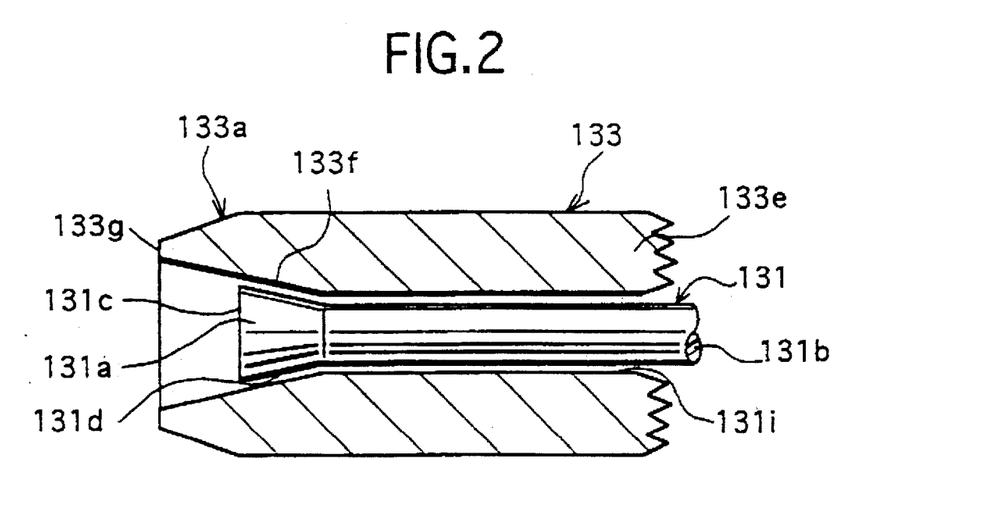
FIG. 2 is an enlarged cross-sectional view of a first embodiment consisting of a ferrule member and an optical fiber cord taken along the axial planes of the ferrule member and the optical cord.

Referring to FIGS. 1 and 2 of the drawings, a first embodiment of an optical connector structure according to the present invention is shown as generally comprising a receptacle assembly 120 for holding an optical object 121, and a plug assembly 130 for holding an optical fiber cord 131 made of synthetic resin. The receptacle assembly 120 includes a stationary receptacle member 122 having a base portion 122a, and a plurality of lobe portions 122b integrally formed with and extending rearwardly of the base portion 122a and each formed with a bore 122c having a fastening member extending therethrough to firmly fasten the receptacle member 122 to a stationary member not shown. The receptacle member 122 further has an outer annular portion 122d projecting forwardly of the base portion 122a and having an open front end face 122e, and an inner annular portion 122f projecting forwardly of the base portion 122a within the outer annular portion 122d and in coaxial relationship with the outer annular portion 122d and having an open front end face 122g. The outer annular portion 122d is formed in the vicinity of the open front end face 122e with an inwardly protruding hook 122h. An annular space 122i is defined between the outer and inner annular portions 122d and 122f of the receptacle member 122 since the diameter of the outer annular portion 122d of the receptacle member 122 is larger than that of the inner annular portion 122f of the receptacle member 122 as will be seen from FIG. 1. The inner annular portion 122f of the receptacle member 122 has a ring-shaped front end portion 122k bent radially inwardly. The optical object 121 is constituted by a light emitting element such as a LED (light emitting diode) received in the inner annular portion 122f of the receptacle member 122 adjacent to the base portion 122a of the receptacle member 122 and having a pair of terminals 121a and 121b.

The receptacle assembly 120 further includes a cylindrical sleeve 123 received in the inner annular portion 122f of the receptacle member 122, and a retainer plate 124 facing and fixed to the base portion 122a of the receptacle member 122 to retain the optical object 121 in cooperation with the cylindrical sleeve 123. The cylindrical sleeve 123 is retained stationary in the inner annular portion 122f of the receptacle member 122 by the optical object 121 and the radially inwardly bent ring-shaped front end portion 122k of the inner annular portion 122f to have the center axis of the optical object 121 aligned with the center axis of the inner annular portion 122f. The cylindrical sleeve 123 has a cylindrical through bore 123a to have the optical object 121 open through the cylindrical through bore 123a and the open front end face 122g of the inner annular portion 122f of the receptacle member 122.

The plug assembly 130 includes a cylindrical plug member 132 having a front chamber 132a and a rear chamber 132b separate from each other by a partition wall 132c positioned at the intermediate portion of the plug member 132 and integrally formed with the plug member 132 to have a through bore 132d extending in coaxial relationship with the front and rear chambers 132a and 132b. The plug member 132 has an outer tongue 132e outwardly rearwardly projecting from the front end face thereof. The outer tongue 132e of the plug member 132 has an outwardly rearwardly projecting hook 132f which is of the configuration engageable with the inwardly projecting hook 122h of the outer annular portion 122d of the receptacle member 122 when the receptacle member 122 and the plug member 132 are coupled with each other. The plug member is so formed as to be snugly received in the annular space 122i between the outer and inner annular portions 122d and 122f of the receptacle member 122 when the optical connection between the optical object 121 and the optical fiber cord 131 is established. The plug assembly 130 further comprises an elongate ferrule member 133 having front and rear end portions 133a and 133b, and an intermediate portion 133e integrally formed with the front and rear end portions 133a and 133b. The intermediate portion 133e of the ferrule member 133 is formed at its centermost point with an annular flange portion 133c to be engaged with the partition wall 132c of the plug member 132. The ferrule member 133 is provided to have the front end portion 133a extend in the front chamber 132a of the plug member 132 with the front end face 133g forwarding projecting from the front end face 132g of the plug member 132, while the rear end portion 133b of the ferrule member 133 extends in the rear chamber 132b of the plug member 132. The intermediate portion 133e of the ferrule member 133 extends partly in the front chamber 132a and partly in the rear chamber 132b of the plug member 132. The through bore 132d of the partition wall 132c of the plug member 132 allows the intermediate portion 133e of the ferrule member 133 to pass therethrough with the annular flange portion 133c of the ferrule member 133 being engaged with the partition wall 132c.

The plug assembly 130 further comprises a spring seating member 134 coupled with the rear end portion of the plug member 132, and a helical compression spring 135 accommodated in the rear chamber 132b of the plug member 132 and having a front end 135a engaged with the flange portion 133c of the ferrule member 133 and a rear end 135b engaged with the spring seating member 134 to resiliently urge the ferrule member 133 toward the front end face 132g of the plug member 132.

The front end portion 133a of the ferrule member 133 is formed with an engaging bore 133f open at its front end face 133g, and the intermediate portion 133e of the ferrule member 133 is formed with a through bore 133i held in communication with the engaging bore 133f. The engaging bore 133f of the ferrule member 133 is in the form of frusto-conical shape rearwardly converged away from the front end face 133g of the ferrule member 133. The optical fiber cord 131 extends in the engaging bore 133f and the through bore 133i of the ferrule member 133 and has a front end portion 131a and an intermediate portion 131b integrally formed with the front end portion 131a. The front end portion 131a of the optical fiber cord 131 is so formed as to be larger in diameter than the intermediate portion 131b of the optical fiber cord 131. The front end portion 131a of the optical fiber cord 131 has an engaging surface 131d in the form of a frusto-conical shape rearwardly converged to be held in pressing engagement with the engaging bore 133f of the ferrule member 133. The front end portion 131a of the optical fiber cord 131 is retained by the front end portion 133a of the ferrule member 133 in engagement with the engaging bore 133f of the ferrule member 133 with the front end face 131c of the optical fiber cord 131 being rearwardly retracted from the front end face 133g of the ferrule member 133 and held in spaced relationship with the front end face 121c of the optical object 121 when the plug member 132 is coupled with the receptacle member 120 to establish optical connection between the optical object 121 and the optical fiber cord 131. In the first embodiment, the optical fiber cord 131 is formed with a flat front end face 131c.

The optical connector structure thus described in the above is operated to have the receptacle member 122 and the plug member 132 coupled with each other by moving the receptacle member and the plug member 132 toward each other to have the front end portion 133a of the ferrule member 133 received in the cylindrical sleeve 123 of the receptacle assembly 120 until the hook 122h of the outer annular portion 122d of the receptacle member 122 is brought into engagement with the hook 132f of the plug member 132. At this time, the front end face 133g of the ferrule member 133 comes to be in pressing engagement with the front end face 121c of the optical element 121 under the influence of the compression spring 135 which is adapted to resiliently urge the ferrule member 133 forwardly, while the front end face 132g of the plug member 132 comes to be held in spaced and face-to-face relationship with the front end face of the base portion 122a of the receptacle member 122. Under these conditions, the front end face 131c of the optical fiber cord 131 is held in spaced and face-to-face relationship with the front end face 121c of the optical object 121 to complete optical connection between the optical fiber cord 131 and the optical object 121.

It is essential that the optical fiber cord be made of synthetic resin because of the fact that the front end portion of the optical fiber cord can easily be transformed, thereby enabling the optical fiber cord to be produced at a relatively low cost. The optical connector structure is available at a relatively low cost in addition with the inexpensive optical fiber cord if the ferrule member is similarly made of synthetic resin.

While there has been described about the first embodiment in which the engaging bore 133f of the ferrule member 133 is in the form of a frusto-conical shape rearwardly converged away from the front end face 133g of the ferrule member 133, and the front end portion 131a of the optical fiber cord 131 has an engaging surface 131d in the form of frusto-conical shape rearwardly converged to be held in pressing engagement with the engaging bore 133f of the ferrule member 133 as shown in FIG. 2, the combination of the front end portion 133a of the ferrule member 133 and the front end portion 131a of the optical fiber cord 131 may be replaced by other combinations described in the following second to fourth embodiments.

Figure 3:
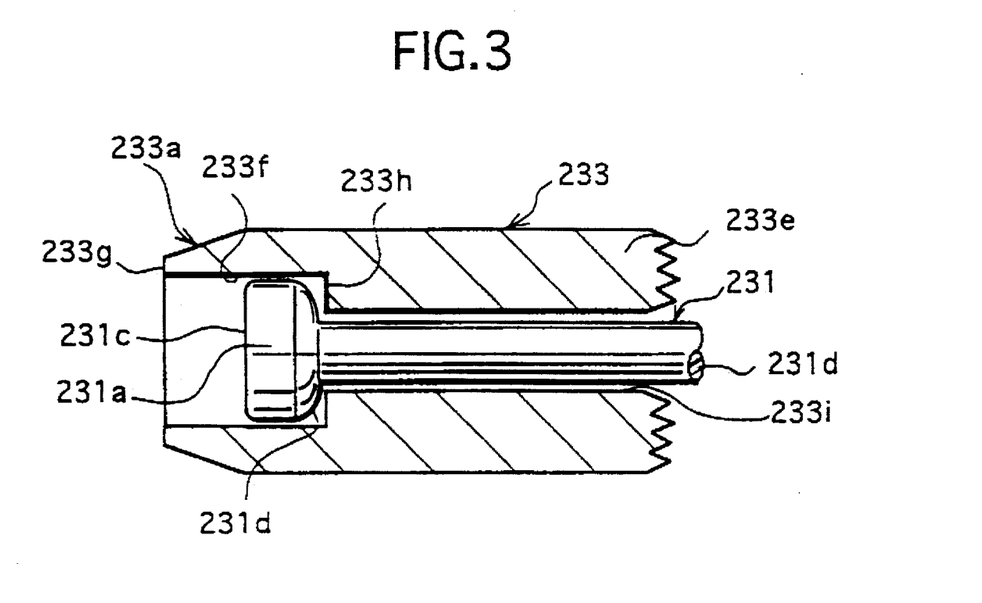
FIG. 3 is a cross-sectional view similar to FIG. 2 but shows a second embodiment consisting of a ferrule member and an optical fiber cord.
Figure 4:
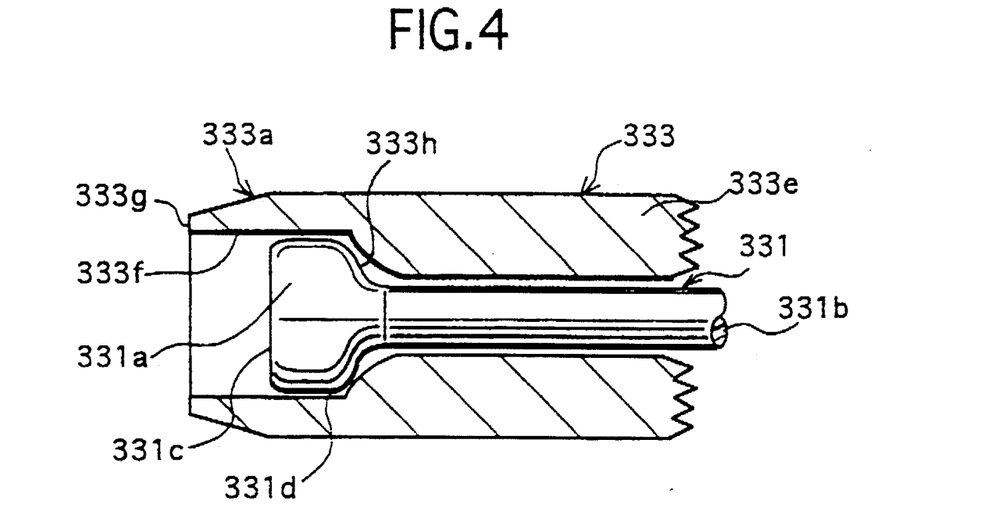
FIG. 4 is a cross-sectional view similar to FIG. 2 but shows a third embodiment consisting of a ferrule member and an optical fiber cord.
Figure 5:
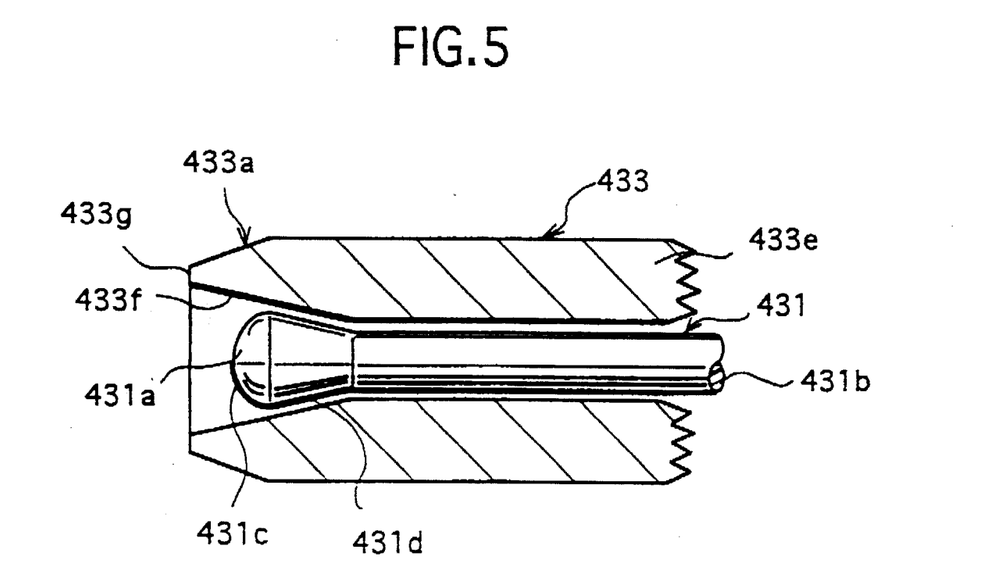
FIG. 5 is a cross-sectional view similar to FIG. 2 but shows a fourth embodiment consisting of a ferrule member and an optical fiber cord.

FIGS. 3 to 5 show second to fourth embodiments respectively comprising ferrule members 233, 333 and 433 respectively having engaging bores 233f, 333f and 433f different in shape from each other, and optical fiber cords 231, 331 and 431 respectively having front end portions 231a, 331a and 431a different in shape from each other. The following description will be made on the particular constructions of the ferrule members 233, 333, 433 and the optical fiber cords 231, 331, 431 in the second and fourth embodiments with reference to FIGS. 3 to 5.

The second embodiment of the front end portion 233a of the ferrule member 233 and the optical fiber cord 231 is shown in FIG. 3 with the engaging bore 233f of the ferrule member 233 being so formed as to be larger in diameter than the through bore 233i and in communication with the through bore 233i by way of a restriction shoulder 233h and with the front end portion 231a of the optical fiber cord 231 being larger in diameter than the through bore 233i and smaller than the engaging bore 233f to be prevented from being moved away from the front end face 233g of the ferrule member 233 by the restriction shoulder 233h. The front end portion 231a of the optical fiber cord 231 is in the form of a round shape. Likewise, the optical fiber cord 231 is formed with a flat front end face 231c in the second embodiment. The combination of the optical fiber cord 231 and the ferrule member 233 according to this embodiment can be easily produced and thus inexpensive for its production cost.

The third embodiment of the front end portion 333a of the ferrule member 333 and the optical fiber cord 331 is shown in FIG. 4 with the engaging bore 333f of the ferrule member 333 being so formed as to be larger in diameter than the through bore 333i and with the front end portion 331a of the optical fiber cord 331 having an engaging surface 331d in the form of frusto-conical shape rearwardly converged, the engaging bore 333f of the ferrule member 333 being in communication with the through bore 333i by way of a restriction shoulder 333h which is in the form of frusto-conical shape rearwardly converged to be held in pressing engagement with the engaging surface 331d of the front end portion 331a of the optical fiber cord 331. Similarly, the front end portion 331a of the optical fiber cord 331 is in the form of a round shape, and the optical fiber cord 331 is formed with a flat front end face 331c in the third embodiment.

The fourth embodiment of the front end portion 433a of the ferrule member 433 and the optical fiber cord 431 is shown in FIG. 5 with the front end face 431c of the optical fiber cord 431 being in the form of a convex shape. The convex shape of the front end face 431c of the optical fiber cord 431 makes it possible to effectively establish optical connection between the optical fiber cord and the optical object, thereby enabling the front end face of the optical fiber cord to be spaced as much as possible away from the front end face of the optical object when the receptacle member and plug member are coupled with the each other.

The other constructions and arrangements of the optical fiber cord 431 and the ferrule member 433 in the fourth embodiment are almost the same as those of the first embodiment. The engaging bore 433f of the ferrule member 433 is in the form of frusto-conical shape rearwardly converged away from the front end face 433g of the ferrule member 433. The front end portion 431a of the optical fiber cord 431 has an engaging surface 431d in the form of frusto-conical shape rearwardly converged to be held in pressing engagement with the engaging bore 433f of the ferrule member 433.

According to the present invention, the optical object 121 may be constituted by any one of an optical fiber cord, a light emitting element and a light receiving element.

The optical fiber cord 131 and the ferrule member 133 thus constructed in each of the above embodiments constitutes as a whole an optical fiber cord assembly which is another aspect of the present invention. The process of producing the optical fiber cord assembly is a further aspect of the present invention.

The process of producing the optical fiber cord assembly according to the present invention will be hereinlater described with reference to FIGS. 6 to 8.

The optical fiber cord assembly producing process according to the present invention comprises a first step of preparing an optical fiber cord 131 made of synthetic resin and having a front end portion 131a and an intermediate portion 131b integrally formed with the front end portion 131a, the front end portion 131a being equal in diameter to the intermediate portion 131b, and a second step of preparing a ferrule member 133 for holding an optical fiber cord 131, the ferrule member 133 having a front end face 133g, a front end portion 133e formed with an engaging bore 133f open at its front end face 133g, and an intermediate portion 133d integrally formed with the front end portion 133e and having a through bore 133i formed therein in communication with the engaging bore 133f.

The optical fiber cord assembly producing process according to the present invention further comprises a third step of stripping a cover material not shown in the drawings from the front end portion 133a of the optical fiber cord 131.

Figure 6:
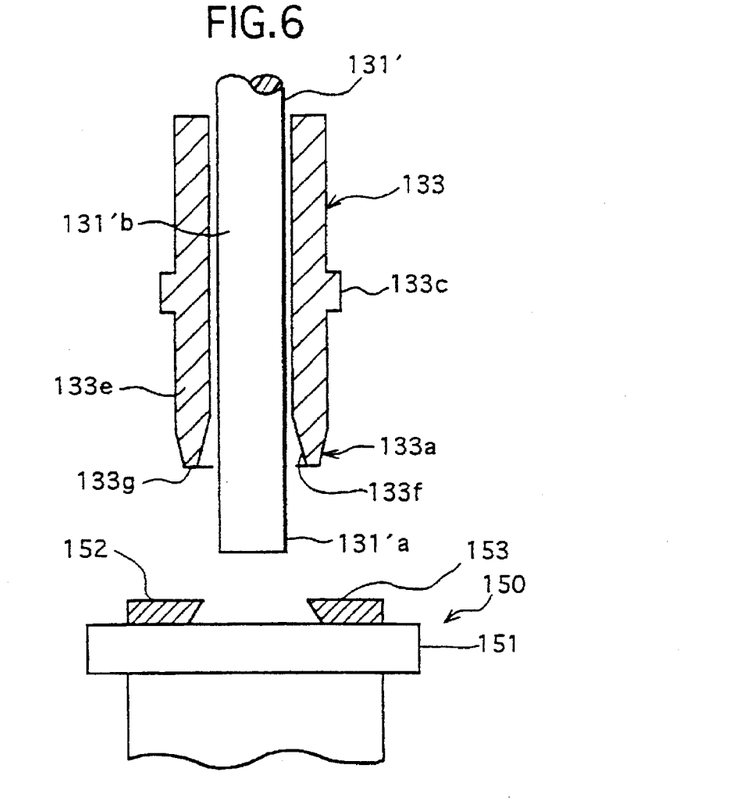
FIG. 6 is a side elevational view partly in cross-section of the ferrule member and the optical fiber cord together with a heating assembly by which the front end portion of the optical cord is transformed into becoming enlarged after the front end portion of the optical fiber cord is projected from the front end face of the ferrule member.

At the fourth step of producing the optical cord assembly according to the present invention, the optical fiber cord 131' is then inserted into the through bore 133i and the engaging bore 133f of the ferrule member 133 until the front end portion 131a' of the optical fiber code 131' projects from the front end face 133g of the ferrule member 133 as shown in FIG. 6. The optical fiber cord 131' and the ferrule member 133 are positioned above a heating assembly 150 which comprises a heating table 151, and a pair of shaping molds 152 and 153 mounted on the heating table 151 and slidably movable toward and away from each other to assume a first position where the front end portion 131a' of the optical fiber cord 131' is shaped by the shaping molds 152, 153 and a second position where the front end portion 131a' of the optical fiber cord 131 is remotest from the shaping molds 152 and 153. The heating table 151 and the shaping molds 152, 153 are adapted to be heated by heating means to a predetermined heating temperature where the front end portion 131a' of the optical fiber cord 131 is transformed by the shaping molds 152,153 into respective predetermined shapes as shown in FIGS. 2 to 5. The heating means is designed to be controlled by control means including a thermo-couple not shown in the drawings. At the fourth step, the shaping molds 152 and 153 are moved away from each other to assume the second position as shown in FIG. 6.

Figure 7:
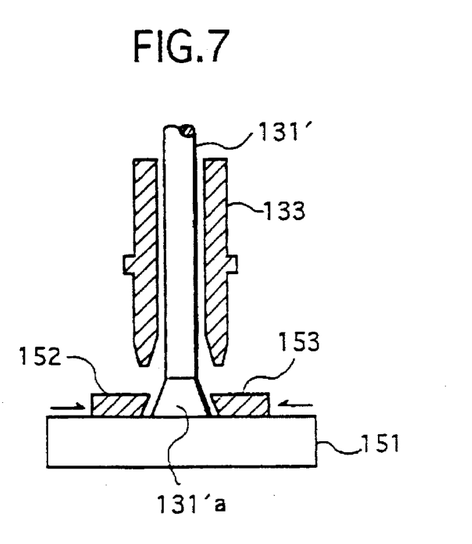
FIG. 7 is a side elevational view similar to FIG. 6 but shows the front end portion of the optical fiber cord which is transformed and becomes enlarged by the heating assembly.
Figure 8:
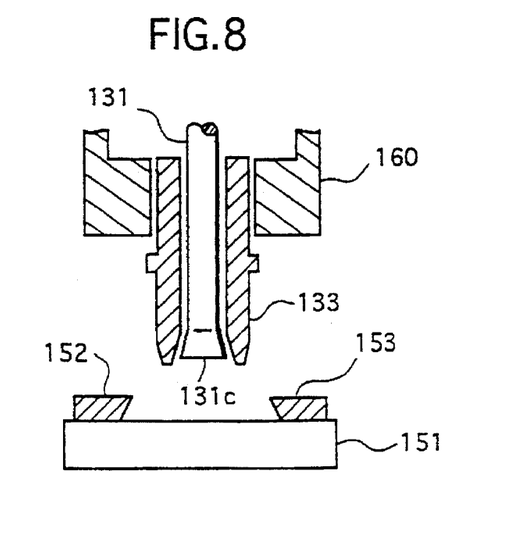
FIG. 8 is a side elevational view similar to FIG. 6 but shows the front end face of the optical fiber cord which is rearwardly retracted from the front end face of the ferrule member after it is transformed and becomes enlarged by the heating assembly.

At the fifth step of producing the optical cord assembly according to the present invention, the front end portion 131a' of the optical fiber cord 131' is brought into pressing engagement with the upper surface of the heating table 151, and the shaping molds 152, 153 are moved toward each other on the heating table 151 to assume the first position as shown in FIG. 7. The front end portion 131a' of the optical fiber cord 131' is then heated by the heating means to the predetermined heating temperature until the front end portion 131a' of the optical fiber cord 131' is transformed into becoming larger in diameter than the through bore 133i of the ferrule member 133 and smaller in diameter than the engaging bore 133f of the ferrule member 133 to produce the front end portion 131a of the optical fiber cord 131 having a frusto-conical shape as shown in FIG. 2. It will readily be understood that the front end portions 231a, 331a, 431a of the optical fiber cords 231, 331, 431 different in shape from the front end portion 131a of the optical cord 131 as shown in FIGS. 3 to 5 can be produced if the shaping molds 152 and 153 are replaced by shaping molds having special inner contours different from that of the shaping molds 152 and 153.

At the sixth step of producing the optical cord assembly according to the present invention, the front end portion 131a of the optical fiber cord 131 is rearwardly retracted until the front end portion 131a of the optical fiber cord 131 is brought into pressing engagement with the engaging bore 133f of the ferrule member 133 to have the front end face 131c of the optical fiber cord 131 rearwardly retracted from the front end face 133g of the ferrule member 133. The retraction amount of the optical fiber cord 131, i.e., the distance (L) between the front end face 131c of the optical fiber cord 131 and the front end face 133g of the ferrule member 133 is in the range of 0.03 mm to 0.6 mm, preferably, 0.05 mm to 0.3 mm which will be described in detail hereinlater. Under these conditions, the optical fiber cord 131 is firmly fastened to the ferrule member 133 by a known device such as for example a calking device 160 as shown in FIG. 8. According to the present invention, the calking device 160 may be replaced by an adhesive material and other mechanical means for securing the optical fiber cord 131 to the ferrule member 133.

Figure 9:
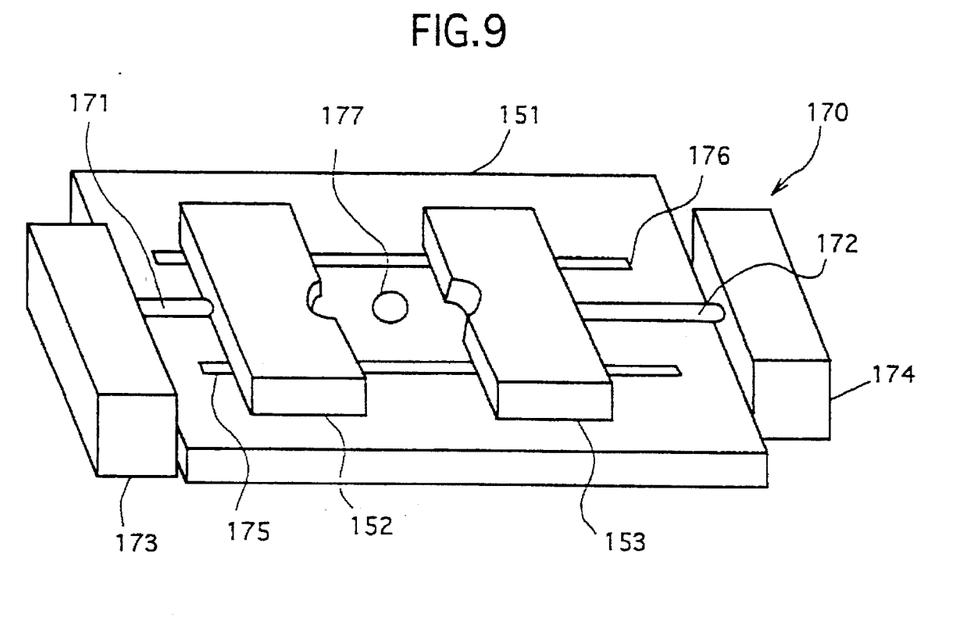
FIG. 9 is a perspective view of the heating assembly.

The shaping molds 152 and 153 are shown in FIG. 9 as being moved by driving means 170 which comprises a pair of screws 171 and 172 partly screwed into the shaping molds 152 and 153, respectively, a pair of driving sources 173 and 174 for driving the screws 171,172, respectively, and a pair of rails 175 and 176 mounted on the heating table 151 in parallel relationship with each other to guide the shaping molds 152 and 153. On the central portion of the heating table 151 between the shaping molds 152 and 153 are marked a circle 177 which serves to have the front end portion 131a of the optical fiber cord 131 guided into a precise position on the heating table 151.

Figure 10:
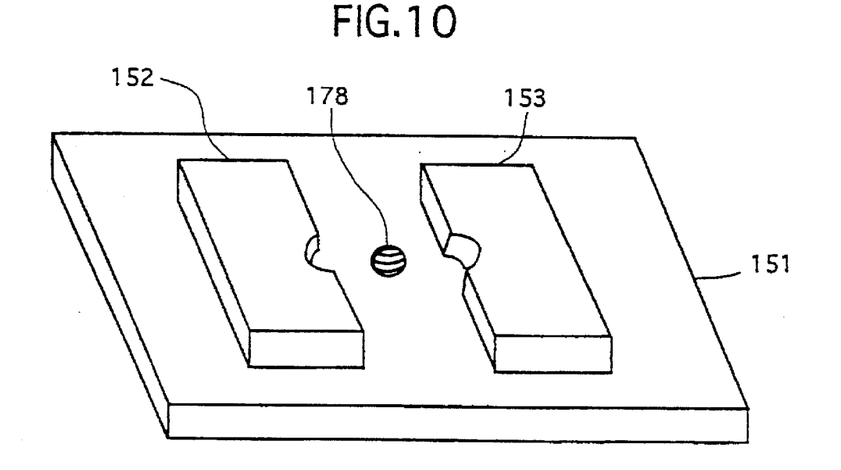
FIG. 10 is a perspective view of a heating table forming part of the heating assembly.

FIG. 10 shows another embodiment characterized by a semi-spherical groove 178 which allows the front end face 431a of the optical fiber cord 431 to receive therein and to shape the front end face 431a of the optical fiber cord 431 into a convex shape. The first, third and fourth embodiments are more advantageous than the second embodiment in that the frusto-conical engaging bores shown in FIGS. 2, 4 and 5 can bring about smaller contraction and expansion stresses than the flat restriction shoulder 231h shown in FIG. 2 since the frusto-conical surface formed in each of the engaging bores 133f, 433f and the restriction shoulder 333h to be in pressing engagement with the frusto-conical engaging surface formed on the front end portions 131a, 331a and 431a of the optical fiber cords 131,331 and 431 in FIGS. 2, 4 and 5 is larger in area than the peripheral edge formed by the flat restriction shoulder 233h and the through bore 233i of the ferrule member 233 shown in FIG. 3.

Figure 11:
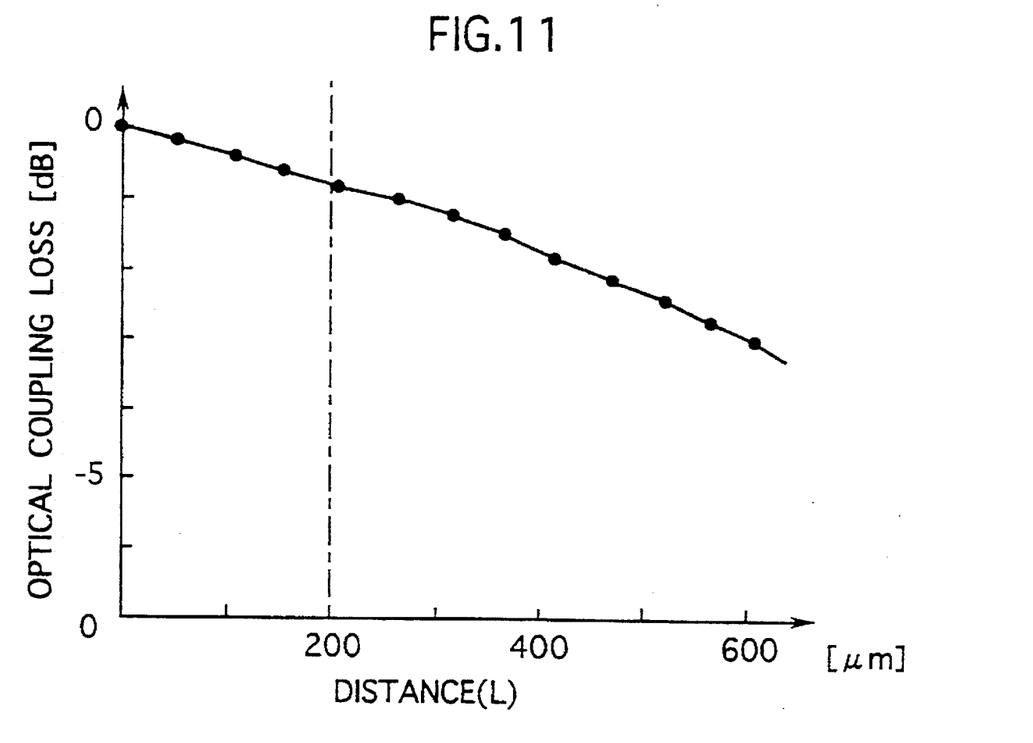
FIG. 11 is a graph representative of a relationship between the distance from the front end face of the optical fiber cord to the front end face of the ferrule member and optical connection loss in accordance with arrangement of an optical fiber cord and a light emitting diode spaced apart from each other.
Figure 12:
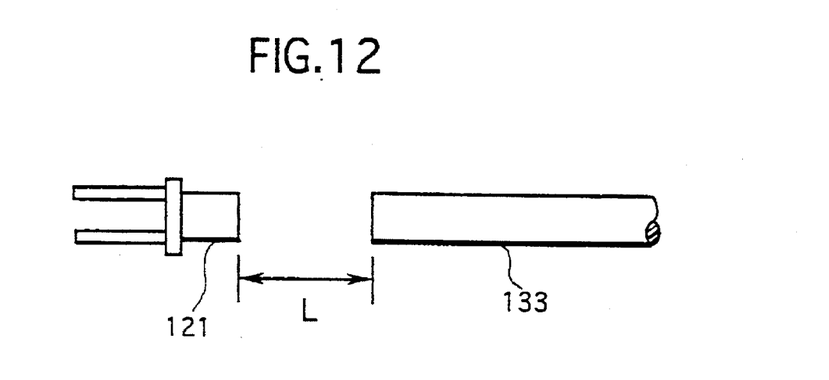
FIG. 12 is a side view of the optical fiber cord and the light emitting diode facing each other.

FIG. 11 shows a graph representative of a relationship between the distance (L) from the front end face of the optical fiber cord to the front end face of the ferrule member and optical connection loss in accordance with arrangement of an optical fiber cord and a light emitting element spaced apart from each other at a distance (L) shown in FIG. 12. The inventors' experiments reveals it preferable that the distance (L) is around 200 μm if an optical fiber cord has a diameter of about 1 mm somewhat smaller than or almost equal to the diameter of the engaging bore measured at the front end face of the engaging bore of the ferrule member. Under these conditions, the optical connection loss is 0.8 dB to the distance of 200 μm as seen from FIG. 11. The reason is such that the optical connection loss of 0.8 dB is in the range of 0.5 dB to 1 dB which is acceptable for the optical connection effectiveness of the optical connector structure. The distance of 200 μm makes it possible to protect the tip of the optical fiber cord in the ferrule member from an operator's finger having a radius curvature of about 10 mm because the operator's finger can by no means reach the front end face of the optical fiber cord sufficiently retracted in the ferrule member. The extremely small distance from the front end face of the optical fiber cord to the front end face of the ferrule member are likely to cause the operator's fingers and tools to arrive at the front end face of the optical fiber cord in the ferrule member.

The retraction amount of the optical fiber cord is determined by a dimensional ratio (L/D) of the distance (L) between the front end face of the optical fiber cord and the front end face of the ferrule member with respect to the diameter (D) of the engaging bore measured at the front end face of the engaging bore of the ferrule member. The dimensional ratio (L/D) is approximately ⅕. On the contrary, the extremely large amount of the previous distance leads to enhance the optical connection loss caused between the front end face of the optical fiber cord and the front end face of the light emitting diode.

Through repeated experiments achieved by the inventors, it is found desirable that the retraction amount be in the range of 0.03 mm to 0.6 mm. If the retraction amount decreases below a lower level of 0.03 mm, the front end face of the optical fiber cord is susceptible to foreign objects and thus cannot be protected from these foreign objects, thereby making the optical connector structure according to the present invention ineffective. If, on the other hand, the retraction amount exceeds an upper level of 0.6 mm, the optical connector structure according to the present invention also becomes ineffective resulting from the reason that the optical connection between the optical object and the optical fiber cord cannot be attained to a satisfactory level the inventors expect. According to the present invention, it is most preferable that the retraction amount ranges from 0.05 mm to 0.3 mm with an optical connection loss less than 3 dB which is considered as being an allowable limit in reality. Various designs and modifications of the optical connector structure can be made with a designer's selection of the retraction amount of 0.03 mm to 0.6 mm in accordance with the optical connection loss and the protection from foreign objects as will be understood from the foregoing inventors' experiments.

The retraction amount of the optical fiber cord is made preferably large in view of protecting the front end face of the optical fiber cord from foreign objects but subjected to the limitation from the optical connection loss. For instance, the retraction amount of approximately 400 μm which is relatively large for its ordinary retraction amount is needed because of the optical fiber cord being handled in the worst environment such as a place where a sharp edge tool is used. This large retraction amount of the optical fiber cord renders it possible to safely and easily handle such a sharp edge tool without damaging the front end face of the optical fiber cord in the ferrule member. The larger retraction amount of the optical fiber cord as seen in the above example results in a higher optical connection loss. According to the present invention, the optical fiber cord having a front end face in the form of a convex shape as shown in FIG. 5 is found most advantageous in the optical connection loss since the convex shape of the optical fiber cord can carry out the optical connection at a lower optical connection loss than the other flat shape of the optical fiber cords shown in FIGS. 2 to 4 even if the front end faces of the optical fiber cord and the light emitting diode are sufficiently distant from each other to protect the front end face of the optical fiber cord from the foreign objects.

The optical fiber cord and the light emitting diode facing each other is shown in FIG. 12 to be used for making a graph representative of a relationship between the distance from the front end face of the optical fiber cord to the front end face of the ferrule member and optical connection loss in accordance with arrangement of an optical fiber cord and a light emitting diode spaced apart from each other at a distance L. The light emitting diode may be replaced by another light emitting element such as a semiconductor laser, or an optical fiber cord, or a light receiving element in accordance with the present invention.

While it has been described in the above embodiments that the optical fiber cord assembly is used for the optical connector structure, the optical fiber cord assembly may be used for, such as for example, checking, wiring, representing, and displaying according to the present invention.

What is claimed is:

1. An optical connector structure for optically connecting an optical object having a front end face and an optical fiber cord made of synthetic resin with each other, comprising:
   a receptacle assembly including a receptacle member for retaining said optical object, and
   a plug assembly including a plug member coupleable with said receptacle member, and a ferrule member retained by said plug member to hold said optical fiber cord,
   said ferrule member having a front end face engageable with said front end face of said optical object to establish optical connection between said optical object and said optical fiber cord when said plug member is coupled with said receptacle member,
   said ferrule member having a front end portion formed with an engaging bore open at its front end face, and an intermediate portion integrally formed with said front end portion and having a through bore formed therein in communication with said engaging bore,
   said optical fiber cord extending in said engaging bore and said through bore of said ferrule member and having a front end portion and an intermediate portion integrally formed with said front end portion,
   said front end portion of said optical fiber cord being so formed as to be larger in diameter than said intermediate portion of said optical fiber cord and retained by said front end portion of said ferrule member in engagement with said engaging bore of said ferrule member with a front end face of said optical fiber cord being rearwardly retracted from said front end face of said ferrule member and held in spaced relationship with said front end face of said optical object when said plug member is coupled with said receptacle member to establish optical connection between said optical object and said optical fiber cord.

2. An optical connector structure as claimed in claim 1, wherein a distance between said front end face of said optical fiber cord and said front end face of said ferrule member is in the range of 0.03 mm to 0.6 mm.

3. An optical connector structure as claimed in claim 2, wherein said distance between said front end face of said optical fiber cord and said front end face of said ferrule member is in the range of 0.05 mm to 0.3 mm.

4. An optical connector structure as claimed in claim 1, wherein said ferrule member is made of synthetic resin.

5. An optical connector structure as claimed in claim 1, wherein said engaging bore of said ferrule member is in the form of a frusto-conical shape rearwardly converged away from said front end face of said ferrule member, and said front end portion of said optical fiber cord has an engaging surface in the form of a frusto-conical shape rearwardly converged to be held in pressing engagement with said engaging bore of said ferrule member.

6. An optical connector structure as claimed in claim 1, wherein said engaging bore of said ferrule member is so formed as to be larger in diameter than said through bore and is in communication with said through bore by way of a restriction shoulder, and said front end portion of said optical fiber cord is larger in diameter than said through bore and smaller than said engaging bore to be prevented from being moved away from said front end face of said ferrule member by said restriction shoulder.

7. An optical connector structure as claimed in claim 1, wherein said engaging bore of said ferrule member is so formed as to be larger in diameter than said through bore, and said front end portion of said optical fiber cord has an engaging surface rearwardly converged, said engaging bore of said ferrule member being in communication with said through bore by way of a restriction shoulder which is rearwardly converged to be held in pressing engagement with said engaging surface of said front end portion of said optical fiber cord.

8. An optical connector structure as claimed in claim 1, wherein said front end face of said optical fiber cord is in the form of a convex shape.

9. An optical connector structure as claimed in claim 1, wherein said optical object is constituted by an optical fiber cord.

10. An optical connector structure as claimed in claim 1, wherein said optical object is constituted by a light emitting element.

11. An optical connector structure as claimed in claim 1, wherein said optical object is constituted by a light receiving element.

12. An optical fiber cord assembly comprising:
   a ferrule member for holding an optical fiber cord made of synthetic resin, said ferrule member having a front end face, a front end portion formed with an engaging bore open at said front end face, and an intermediate portion integrally formed with said front end portion and having a through bore formed therein in communication with said engaging bore,
   said optical fiber cord extending in said engaging bore and said through bore of said ferrule member and having a front end portion and an intermediate portion integrally formed with said front end portion, said front end portion of said optical fiber cord being so formed as to be larger in diameter than said intermediate portion of said optical fiber cord and retained by said front end portion of said ferrule member in engagement with said engaging bore of said ferrule member with said front end face of said optical fiber cord being rearwardly retracted from said front end face of said ferrule member.

13. An optical fiber cord assembly as claimed in claim 12, wherein a distance between said front end face of said optical fiber cord and said front end face of said ferrule member is in the range of 0.03 mm to 0.6 mm.

14. An optical fiber cord assembly as claimed in claim 13, wherein said distance between said front end face of said optical fiber cord and said front end face of said ferrule member is in the range of 0.05 mm to 0.3 mm.

15. An optical fiber cord assembly as claimed in claim 12, wherein said ferrule member is made of synthetic resin.

16. An optical fiber cord assembly as claimed in claim 12, wherein said engaging bore of said ferrule member is in the form of a frusto-conical shape rearwardly converged away from said front end face of said ferrule member, and said front end portion of said optical fiber cord has an engaging surface in the form of a frusto-conical shape rearwardly converged to be held in pressing engagement with said engaging bore of said ferrule member.

17. An optical fiber cord assembly as claimed in claim 12, wherein said engaging bore of said ferrule member is so formed as to be larger in diameter than said through bore and is in communication with said through bore by way of a restriction shoulder having said front end portion of said optical fiber cord being prevented from being moved away from said front end face of said ferrule member.

18. An optical fiber cord assembly as claimed in claim 12, wherein said engaging bore of said ferrule member is so formed as to be larger in diameter than said through bore, and said front end portion of said optical fiber cord has an engaging surface rearwardly converged, said engaging bore of said ferrule member being in communication with said through bore by way of a restriction shoulder which is rearwardly converged to be held in pressing engagement with said engaging surface of said front end portion of said optical fiber cord.

19. An optical fiber cord assembly as claimed in claim 12, wherein said front end face of said optical fiber cord is in the form of a convex shape.

20. A process of producing an optical fiber cord assembly, comprising the steps of:

preparing an optical fiber cord made of synthetic resin and having a front end portion and an intermediate portion integrally formed with said front end portion, said front end portion being equal in diameter to said intermediate portion;

preparing a ferrule member for holding said optical fiber cord, said ferrule member having a front end face, a front end portion formed with an engaging bore open at said front end face, and an intermediate portion integrally formed with said front end portion and having a through bore formed therein in communication with said engaging bore;

stripping a cover material covering said optical fiber cord from said front end portion of said optical fiber cord;

inserting said optical fiber cord into said through bore and said engaging bore of said ferrule member until said front end portion projects from said front end face of said ferrule member;

imparting heat to said front end portion of said optical fiber cord until said front end portion of said optical fiber cord becomes larger in diameter than said through bore of said ferrule member and smaller in diameter than said engaging bore of said ferrule member, and rearwardly retracting said front end portion of said optical fiber cord until said front end portion of said optical fiber cord is brought into pressing engagement with said engaging bore of said ferrule member whereby said front end face of said optical fiber cord is rearwardly retracted from said front end face of said ferrule member within said engaging bore of said ferrule member.

21. A process of producing an optical fiber cord assembly as claimed in claim 20, further comprising the step of:

shaping said front end face of said optical fiber cord when said front end portion of said optical fiber cord becomes larger in diameter than said through bore of said ferrule member and smaller in diameter than said engaging bore of said ferrule member.

22. A process of producing an optical fiber cord assembly as claimed in claim 21, wherein said front end face of said optical fiber cord is shaped into becoming flat.

23. A process of producing an optical fiber cord assembly as claimed in claim 21, wherein said front end face of said optical fiber cord is formed into a convex shape.

* * * * *